2,805,951

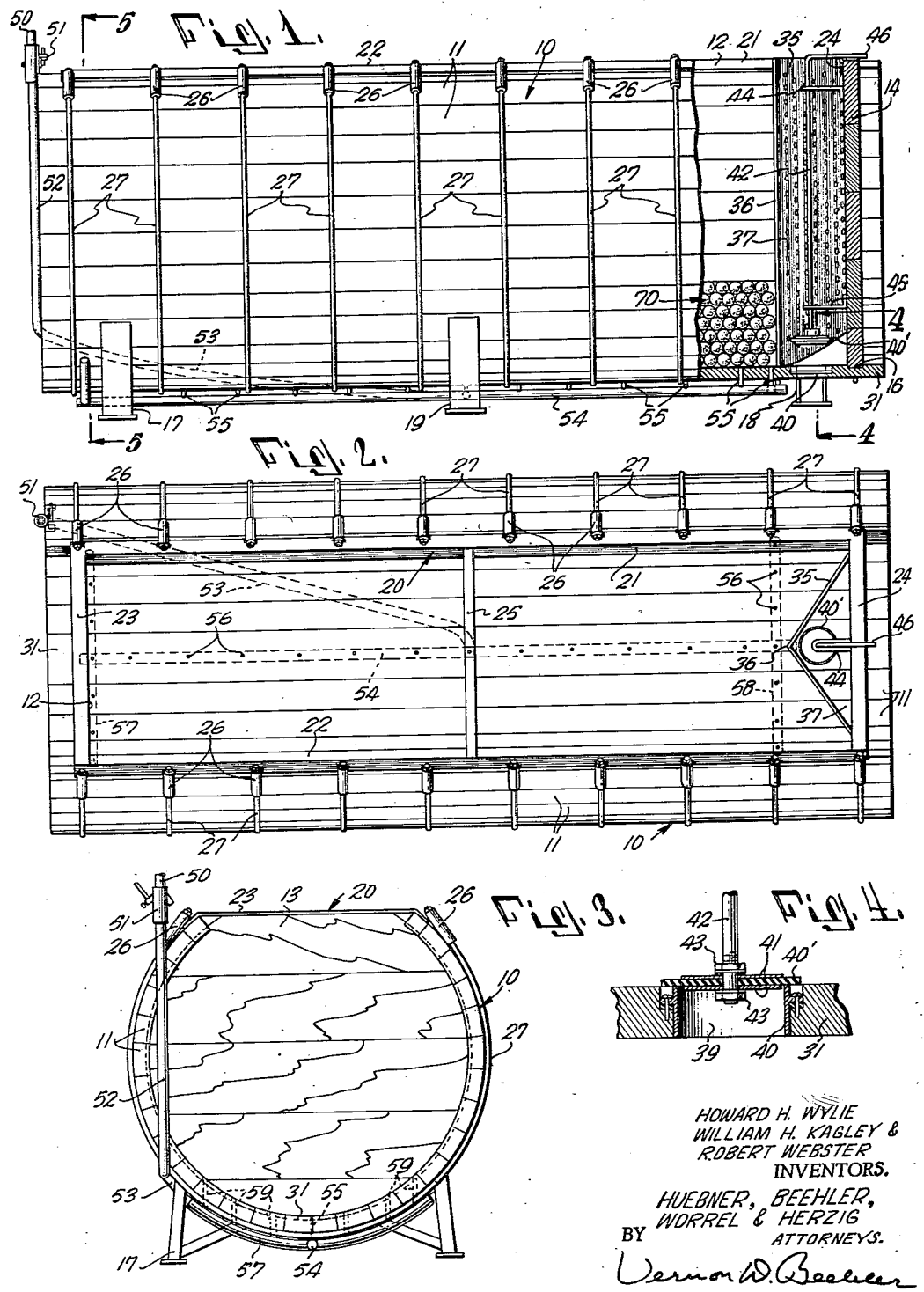

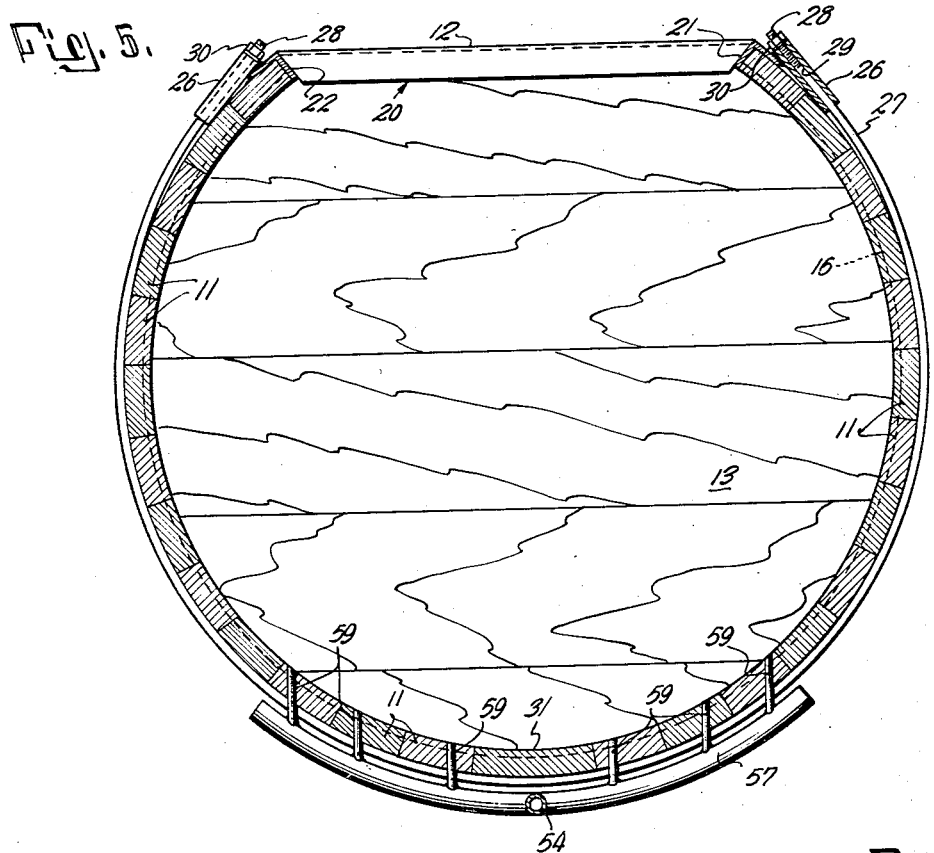
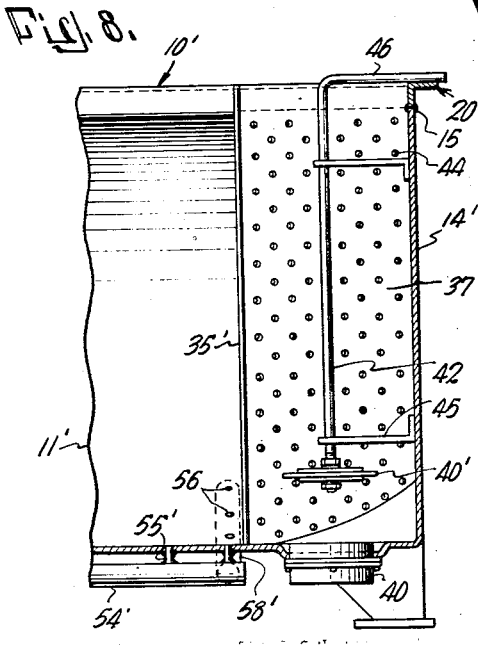
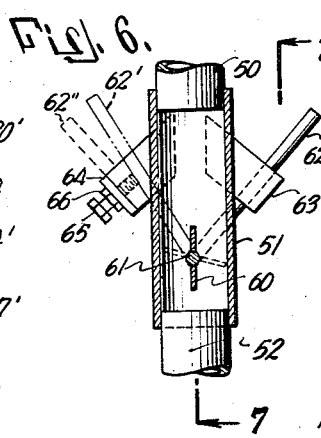
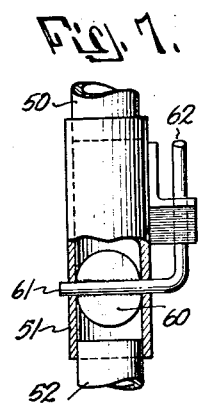
HOWARD H. WYLIE
WILLIAM H. KAGLEY &
ROBERT WEBSTER
INVENTORS.
HUEBNER, BEEHLER,
WORREL & HERZIG
ATTORNEYS.

OLIVE TREATING PROCESS

William H. Kagley, Howard H. Wylie, and Robert Webster, Lindsay, Calif., assignors to Lindsay Ripe Olive Co., Lindsay, Calif., a corporation of California Continuation of application Serial No. 261,064, December 11, 1951. This application August 5, 1954, Serial No. 448,078

2 Claims. (Cl. 99—156)

The invention relates to the treatment of olives to render them edible and has particular reference to a treating process and a tank for employment of the process by which large quantities of olives may be treated in such fashion that the treatment is uniform and productive of a substantially high percentage of first grade treated olives. This application is a continuation of copending application Serial No. 261,064 filed December 11, 1951, now Patent No. 2,719,477, issued October 4, 1955.

In the treatment of olives, whether green or ripe, it has long been and still continues to be the practice to pickle the olives for a substantially long period of time in a water solution of sodium hydroxide. During treatment it is essential that the solution be aerated in order to produce best results. To treat the olives uniformly and evenly it is highly desirable to employ some means of agitating the olives so that they do not continue to rest on the same spot during the entire period of treatment which would otherwise cause a definite discoloration at the spot and make the olives objectionable from the sales standpoint even when not damaged by the spotty condition.

Heretofore mechanical means have been provided for agitating or tumbling the olives periodically during treatment. Agitating or tumbling in the manner previously employed has resulted in a certain percentage of bruised fruit which is always detrimental to the process. When agitation insufficiently vigorous to thoroughly mix the olives is employed, the resulting mixing of the olives by methods heretofore used has been found insufficient to assure a high percent of acceptable treated olives.

It is therefore among the objects of the invention to provide a new and improved process for the treatment and curing of olives of all kinds which makes use of air as an agitating means in such manner that by use of air and a container of special shape the olives are thoroughly mixed during the course of the pickling treatment.

Another object of the invention is to provide a new and improved process for use in the pickling or treatment of olives which makes use of curved walls in an appropriate container to assist in rolling the fruit from one position to another in the container when air is injected for mixing purposes so that movement of the fruit, although sufficiently gentle to avoid bruising, is at the same time complete and thorough.

Another object of the invention is to provide a new and improved treatment for olives which makes possible the treating of substantially large batches of olives thoroughly and efficiently and moreover avoids dead spots in the process where fruit might remain during the pickling process and thus fail to be given a suitable treatment.

Also among the objects of the invention is to provide a new and improved process for the treatment or pickling of olives by means of which large masses of olives may be treated with air in a steady small trickle for aeration purposes supplemented by periodic blasts of air under increased pressure at corresponding locations serving as the sole means of agitating the olives during the process.

With these and other objects in view, the invention consists in the construction, arrangement and combination of the various parts of the device for the utilization of distinct steps in the process whereby the objects contemplated are attained, as hereinafter set forth, pointed out in the appended claims and illustrated in the accompanying drawings.

In the drawings:

Figure 1 is a side view of the tank partly broken away to show the interior.

Figure 2 is a top view of the tank.

Figure 3 is a left end elevational view of the tank.

Figure 4 is a fragmentary sectional view of the tank taken on the line 4—4 of Figure 1.

Figure 5 is a cross-sectional view of the tank drawn to a larger scale and taken on the line 5—5 of Figure 1.

Figure 6 is a fragmentary vertical sectional view of a valve used in the air line.

Figure 7 is an elevational view partially cut away of the air valve taken on the line 7—7 of Figure 6.

Figure 8 is a vertical sectional view showing the drain outlet in a modified form of the tank.

As illustrated particularly in the drawings, the treating tank for employment of the process and indicated generally by the reference character 10 is constructed of wooden staves. In practice redwood staves have been found to be particularly advantageous from a purely structural point of view. The tank is provided with a sufficient number of staves 11 so that it has a cylindrical form and an opening 12 at the top, the opening being rectangular in shape and extending substantially throughout the full length of the tank. The ends of the tank are closed respectively by means of heads 15 and 14 which are set within the inner surfaces of the staves where, as suggested in Figure 1, the heads may be received in notches 16 in much the same fashion as a head is set in a barrel. To support the cylindrical tank on its side as shown, there are provided legs 17, 18, 19, etc., which are located at the ends and at the middle in the positions illustrated.

The rectangular aperture heretofore designated by the reference character 12 is defined by a frame 20, rectangular in shape, and consisting of side elements 21 and 22 and end elements 23 and 24. The rectangular frame shown in somewhat greater detail in Figure 5 is constructed of angle pieces forming the side and end elements, these angle pieces being preferably welded at the corners in order to provide sufficient ruggedness and rigidity. A brace 25 may be provided at the mid-point intermediate the heads in order to reinforce the frame at the center. Along the sides 21 and 22 of the recatngular frame are anchored sleeves 26 which are welded near their tops to the outer leg of the angle in each case. The sleeves 26 are made short enough so that the upper end is approximately level with the top edge of the frame, the lower end extending downwardly and outwardly an arbitrary distance but one sufficiently great to provide a satisfactorily strong and rigid anchor for hoops 27. The hoops herein shown and described are essentially iron rods having threaded ends 28 which are adapted to be inserted into apertures 29 of the sleeves 26 as especially indicated in Figure 5. The threaded ends have nuts 30 attached thereto in order to hold the hoops in place and to provide a certain tension on the hoops as the nuts are screwed tight so that the staves 11 forming the tank are drawn tightly together to make water-tight joints. The staves 11 are of substantially uniform width. It has been found advantageous, however, to provide a single stave 31 at the bottom or lowermost level of the tank which is somewhat wider than the remaining staves 11.

At the right-hand end of the tank, as viewed in Figures 1 and 2, there is provided an intermediate perforate metal wall 35 preferably V-shaped with the apex 36 of the V-shaped wall extending vertically at the center of the tank. The V-shaped walls form a drain chamber 37 at the end of the tank.

Serving the drain chamber is an outlet 39 which is located at the bottom of the tank and also, incidentally, at the bottom of the drain chamber. The outlet may be formed with an outlet sleeve 40 lining the outlet and secured to the wide center stave 31. To open and close the drain there is provided a valve or plunger 40' of suitable soft material sufficient to effectively close the outlet, the valve being held together by means of plates or washers 41 attached to a rod 42 by means of conventional nuts 43. The rod is guided to a proper position by means of upper and lower brackets 44, 45 which in turn are secured to the head 14. The rod 42 may have an angularly bent upper end 46 which can be rotated to the position shown in Figure 1 overlying the head 14 when it is desired to hold the plunger or valve 40' in open position. When it is desired to close the outlet, it is necessary only to rotate the rod until the end 46 is clear of the head 14 and then have the plunger drop until the valve seats on the sleeve 40 as indicated in Figure 4.

To supply air to the tank for the pickling process and also for agitating a mass of olives, there is provided an air inlet conduit 50 having a valve 51 therein located immediately adjacent the tank and near the top. An extension 52 of the conduit extends downwardly to connect with a somewhat arcuate section 53 which extends outside and beneath the tank. Extending along the center of the tank and immediately beneath the lowermost portion thereof is a longitudinally disposed conduit section 54 which extends throughout the entire length of the tank. On the upper side of the conduit section 54 there are provided at longitudinally spaced intervals short pipe sections or nipples 55 which extend upwardly through the lowermost stave 31 of the tank. The nipple 55 in each case is designed to pass through the stave 31 until it emerges flush with the inside surface of the stave on the inside of the tank, thereby providing air inlets or inlet orifices 56. The location and spacing of these inlet orifices is best illustrated in Figure 2.

Auxiliary to the nipples 55 is an arcuate air conduit 57 at one end and a similar air conduit 58 at the other end. From these air conduits 57 and 58 extend nipples 59 which travel through adjacent staves 11 and emerge flush with the inside surfaces of those staves at a location immediately adjacent the junction of the head 13 with the staves at one end and at the junction approximately of the perforate walls 36 and the inside surface of the staves at the other end. Air may thus be introduced at the corner thus formed which under ordinary circumstances would comprise a somewhat dead pocket within which fruit might lodge and remain.

The valve 51 is essentially a butterfly valve 60 which is pivoted upon a valve stem 61 as shown especially in Figures 6 and 7, the valve stem being supported by the wall of the valve or valve casing. A handle 62 on the valve stem is provided to assure ready manipulation of the valve. The handle is designed to travel within a bracket having one end 63 and another end 64 each end being provided with a suitable stop. At the end 64, however, there may be provided an adjusting screw 65 equipped with a suitable lock nut 66 which can be extended into the end 64 and thus vary the position or stop against which the valve handle 62 comes to rest at a certain stage of operation, as for example in the position 62' illustrated in Figure 6.

Although construction of the tank form staves has been found especially advantageous, it is possible under other circumstances to form a tank 10' of sheet metal having sheet metal ends 14' attached by a weld 13 to an angular frame member 20'. A wall 11' of the tank 10' is preferably semi-cylindrical extending around the sides and forming the bottom of the tank 10'. Within the tank may be provided a perforate wall 35' forming a drain chamber 37'. At the bottom of the drain chamber is an outlet sleeve 40 adapted to be closed by the plunger 40' manipulated by the rod 42 held by the brackets 44 and 45 in the same fashion as the rod previously described in connection with the preferred form.

The metal tank illustrated in Figure 8 is also provided with a longitudinal conduit member 54' having nipples 55' extending upwardly therefrom and into the interior of the tank where they emerge flush with the inside wall. Here too auxiliary air conduits in the nature of the arcuate conduit 58' is adapted to carry air to the corner formed by the junction of the perforate wall 35' and wall 11' of the tank.

In the practice of the process comprising the invention it is customary to fill the tank with olives, green or ripe, which are to be treated. After the olives are in the tank and have been washed, the wash water being permitted to pass into the drain chamber 37 and thence out the drain outlet 39, the outlet may be stoppered. At this point the pickling solution, namely, an aqueous or water solution of sodium hydroxide, is added to the tank until the olives are completely covered. It might be said, incidentally, that the tank may be filled with olives virtually to the top just below the frame 20 and the solution filled to that level. Then the process is started by setting the butterfly valve 60 so that it admits a small trickle of air into the air conduit. The setting is achieved by manipulation of the screw 65 so that the butterfly valve is opened slightly when the arm 62 of the valve stem 61 rests against the screw in the position 62' illustrated in Figure 6. Under circumstances where it might be desired to shut the valve off completely, the screw 65 may be withdrawn until the handle is able to occupy the position 62" there shown.

As the air passes through the butterfly valve, it continues to flow through the conduits 52, 53, 54, 57 and 58. The air, being under a slight pressure after filling the conduits, emerges therefrom through the centrally disposed and longitudinally spaced nipples 55 and also through the nipples 59 at the ends. The air thus trickles through bubbles through the solution and maintains the solution active.

At periodic intervals, depending upon the rate of operation of the process and the concentration of the pickling solution used and other factors recognized by those skilled in the art, a blast comprising a high volume of air is admitted into the tank. The blast may be long or short depending upon requirements. It, however, must be sufficiently forceful so that the quantity of air at the pressure employed, when introduced beneath the mass 70 of olives, like the mass pictured in Figure 1, is sufficient to blow the olives along the lowermost level of the tank or bottom center line and also the olives immediately above that area upwardly into the mass. A pressure of 2 lbs. per sq. inch has been used successfully. As these olives are blown upwardly, they leave a space so that olives lying on one side or another of the bottom roll down the curved inside walls of the tank formed by the staves until they roll to the lowermost level. The places of these rolling olives are taken by olives immediately above them which roll one upon the other and against the inside wall of the tank downwardly toward the lower level center line. The air blast is kept up a sufficient length of time so that there is relatively complete agitation each time. As soon as the olives have been agitated enough to move them all around to new positions where new spots rest against other olives and the interior walls of the tank, the butterfly valve is then thrown back to air trickle position, the position 62' of Figure 6, and air thereafter continues only to trickle through the nipples into the aqueous solution. Should olives collect at the corners formed by the junction of the heads with the wall of the tank, the air coming through the nipples 59, for example, will blow the olives out of the corners and force them back into general circulation. The agitation by blast of air may be repeated as frequently as desired at periodic intervals throughout the entire length of the pickling or treating process.

After the process has run to its conclusion, the plunger 40' may be lifted from the outlet 39 and the caustic solution or aqueous solution of sodium hydroxide drained out the outlet and the olives thereafter suitably washed prior to being removed in the customary fashion.

The operation of the metal tank is on the same principle as the wood tank described in the preferred form.

There has thus been described a relatively simple but effective process suited especially to the treating of olives by means of which they are agitated by a blast of air. Moreover, by applying orifices for the blast of air the same as the orifices employed for admitting air at a trickling rate to promote the treating or curing of the olives, the practice is kept as simple as possible. Moreover, by providing the sloping walls at the interior of the container, the olives are permitted to freely roll along the walls without the necessity for violent agitation. The form and direction of the walls assist considerably in the agitation as that agitation is induced by an inwardly directed strong blast of air in the solution at the lowermost level. The general structure of the apparatus is permissive of a complete processing before the olives need be removed.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent processes.

Having descrbied our invention, what we claim as new and desire to secure by Letters Patent is:

1. An olive treating process comprising preparing a quantity of olives in a solid mass and maintaining said mass free of obstructions of any kind and in form such that the bottom of the mass slopes gradually downwardly and inwardly, covering all the olives of said mass with an aqueous solution of sodium hydroxide, applying a continuous trickle of air to the solution at a lowermost level of the mass and at a force low enough that the positions of the olives are not disturbed and the olives remain substantially at rest, and at periodic intervals injecting a prolonged blast of air at the bottom of the mass under increased pressure and volume great enough that olives above and immediately adjacent said locations are moved upwardly through the mass thereby causing olives at outer portions and adjacent the bottom of the mass to move toward the low areas of the mass.

2. An olive treating process comprising preparing a quantity of olives in a solid mass and maintaining said mass free of obstructions of any kind and in form such that the bottom of the mass slopes gradually downwardly and inwardly, covering all the olives of said mass with an aqueous solution of sodium hydroxide, applying a continuous trickle of air at spaced locations to the solution at a lowermost level of the mass and at a force low enough that the positions of the olives are not disturbed and the olives remain substantially at rest, and at periodic intervals injecting a prolonged blast of air at said spaced locations under increased pressure and volume great enough that olives above and immediately adjacent said locations are moved upwardly through the mass and constrained only by adjacent olives in the mass thereby causing olives at outer portions and adjacent the bottom of the mass to move in a rolling motion toward said locations, and finally removing said solution and without shifting the location of said mass washing the olives in said mass with water agitated by air at said locations.

References Cited in the file of this patent

UNITED STATES PATENTS

| | | |
|---|---|---|
| 2,464,947 | Sammis et al. | Mar. 22, 1949 |
| 2,582,371 | Ball et al. | Jan. 15, 1952 |
| 2,719,477 | Kagley et al. | Oct. 4, 1955 |